United States Patent [19]

Wägli et al.

[11] 4,429,224

[45] Jan. 31, 1984

[54] OPTICAL ARRANGEMENT FOR AN INFRARED INTRUSION DETECTOR

[75] Inventors: Peter Wägli, Uetikon; Alois Zetting, Herrliberg; Gustav Pfister, Uerikon, all of Switzerland

[73] Assignee: Cerberus AG, Männedorf, Switzerland

[21] Appl. No.: 310,917

[22] Filed: Oct. 13, 1981

[30] Foreign Application Priority Data

Oct. 24, 1980 [CH] Switzerland ........................ 7925/80

[51] Int. Cl.³ ................................................ G01J 1/00

[52] U.S. Cl. .................................... 250/342; 250/353

[58] Field of Search ............... 250/338, 340, 342, 353; 340/565, 567; 350/1.3, 1.4, 96.1, 96.23, 96.28, 452

[56] References Cited

U.S. PATENT DOCUMENTS

| | | | |
|---|---|---|---|
| 3,703,718 | 11/1972 | Berman | 250/338 |
| 3,760,399 | 9/1973 | Schwarz | 340/567 |
| 3,829,693 | 8/1974 | Schwarz | 250/342 |
| 3,958,118 | 5/1976 | Schwarz | 340/567 |
| 4,081,680 | 3/1978 | Keller | 250/342 |
| 4,166,955 | 9/1979 | Keller | 250/342 |
| 4,238,675 | 12/1980 | Turlej et al. | 250/353 |
| 4,321,594 | 3/1982 | Galvin et al. | 250/353 |
| 4,342,987 | 8/1982 | Rossin | 250/340 |

*Primary Examiner*—Janice A. Howell

*Attorney, Agent, or Firm*—Werner W. Kleeman

[57] ABSTRACT

The optical arrangement for an infrared intrusion detector containing a plurality of separate radiation receiving regions or fields of view is provided with a first focussing optic or optical system, for instance a Fresnel lense which receives with its entire surface or area the infrared radiation which arrives from all of the receiving regions and delivers such received radiation to a multiplicity of further focussing means, for instance to individual reflectors. These reflectors are correlated in each instance to one of the receiving regions or fields of view and focus the radiation arriving from such receiving region upon a sensor element. In this way there is attained the beneficial result of optimum utilization of the infrared radiation which is available and the sensitivity of the infrared intrusion detector can be increased. The dimensions of the optical arrangement and the intrusion detector can be maintained small and relatively imperceptible.

17 Claims, 4 Drawing Figures

OPTICAL ARRANGEMENT FOR AN INFRARED INTRUSION DETECTOR

CROSS-REFERENCE TO RELATED APPLICATION

This application is related to the commonly assigned, copending U.S. application Ser. No. 06-305,032, filed Sept. 23, 1981 entitled "INFRARED INTRUSION DETECTOR".

BACKGROUND OF THE INVENTION

The present invention relates to a new and improved construction of an optical arrangement for an infrared intrusion detector which is of the type containing a number of optical focussing means which focus infrared radiation, arriving from a plurality of separate receiving regions or fields of view, upon at least one common sensor element.

Such arrangements take-up or receive the infrared radiation emitted by an individual at a monitored region and transmit such received infrared radiation to a sensor element. If the monitored region is divided into a number of separate receiving regions or fields of view between which there are located dark fields or zones, then each movement of a person causes a modulation of the infrared radiation received by the sensor element. This modulated infrared radiation can be evaluated by means of a conventional evaluation circuit for the purpose of indicating that an intruder has entered the monitored region or area and for giving an alarm signal.

In order to obtain the required separate receiving regions or fields of view it is known, for instance, from U.S. Pat. No. 3,703,718, U.S. Pat. No. 4,058,726 and U.S. Pat. No. 4,081,680, to provide a plurality of reflectors which are aligned in different directions. This plurality of reflectors focus the radiation arriving from different receiving regions upon the same sensor element. Each reflector is operatively correlated with a different receiving region and only focusses the radiation from such receiving region upon the sensor element. What is disadvantageous with this system design is that the entire receiving surface is divided into a great many small segments. Therefore, only a small quantity of radiation is taken-up or received from the individual receiving regions, so that the sensitivity of such infrared intrusion detectors frequently is inadequate, particularly if there are provided a great number of receiving regions or fields of view.

This shortcoming can be avoided with the arrangements disclosed in U.S. Pat. No. 3,760,399, U.S. Pat. No. 3,829,693 or U.S. Pat. No. 3,958,118, wherein there is provided a single reflector for all receiving regions or fields of view and the division into the individual regions is accomplished by means of a number of juxtapositioned or adjacently arranged sensor elements. While there is available a common, relatively large reflector surface or area for all receiving regions, nonetheless the plurality of sensor elements require a complicated and disturbance-prone circuit, and additionally, there is markedly limited the number of possible sensor elements, and thus, the receiving regions.

In British Pat. No. 2,012,045 and in the European Pat. No. 0 014 825 there have become known in this technology arrangements wherein the focussing of the infrared radiation upon a common sensor element is accomplished by multiple reflections. Here, the first reflection however again is accomplished at individual mirror or reflector segments, and each such mirror segment is correlated to a different receiving region or field of view. Therefore, such arrangements likewise are afflicted with the drawback that only a small quantity of radiation is received from the individual receiving regions and the sensitivity of the detector is thus frequently inadequate. In order to nonetheless obtain a good sensitivity, it was therefore necessary with such state-of-the-art infrared intrusion detectors to use relatively large mirror segments, so that the dimensions of such infrared intrusion detectors became relatively large. Hence, it was hardly possible to mount such relatively large sized detectors in a manner such that they were unnoticed or imperceptible, as the same is frequently desired for intrusion detection equipment.

SUMMARY OF THE INVENTION

Therefore, with the foregoing in mind it is a primary object of the present invention to provide a new and improved construction of optical arrangement for an infrared intrusion detector which is not associated with the aforementioned drawbacks and shortcomings of the prior art constructions.

Another and more specific object of the present invention aims at avoiding the previously discussed drawbacks of the state-of-the-art infrared intrusion detectors and, in particular, to provide a new and improved construction of infrared intrusion detector which is capable of receiving from the individual receiving regions a larger quantity of radiation and possesses an increased sensitivity and smaller dimensions.

Still a further significant object of the present invention is directed to a new and improved construction of infrared intrusion detector equipped with novel optical means, which detector is relatively simple in construction and design and extremely reliable in operation, economical to fabricate, not readily prone to malfunction, and requires a minimum of maintenance and servicing.

Now in order to implement these and still further objects of the invention, which will become more readily apparent as the description proceeds, the infrared intrusion detector of the present development is manifested by the features that there is provided a first focussing means which is common to all of the receiving regions or fields of view. This first focussing means directs the incident radiation received from all of the receiving regions upon a plurality of further focussing means, of which each is operatively correlated to one of the receiving regions or fields of view and the number of which corresponds to the number of receiving regions and which are arranged and constructed such that the radiation which arrives from each of the receiving regions is focussed by the first common focussing means and then from the related operatively correlated further focussing means upon the sensor element.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
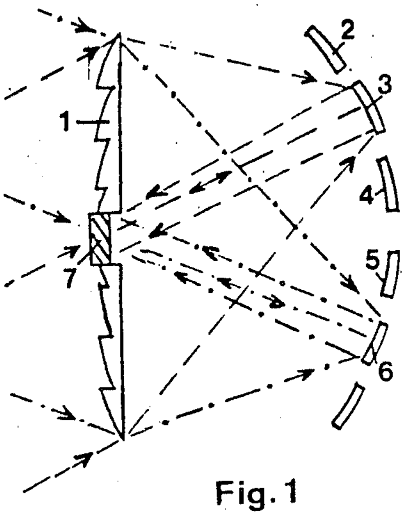
FIG. 1 illustrates a first optical arrangement containing a centrally positioned sensor element.

Describing now the drawings, it is to be understood that only enough of the construction of the infrared intrusion detector has been shown in order to preserve clarity in illustration and to enable those skilled in this technology to readily understand the underlying principles and concepts of the present development. Turning attention now specifically to the embodiment of FIG. 1 there is illustrated an optical arrangement therein which is provided with a collecting lense 1 as the first focussing means. In the embodiment under discussion the collecting lense 1 is constructed as a Fresnel lense. Such stepped lenses can be fabricated in a most simple fashion from a suitable transparent material by pressing or moulding.

It is particularly advantageous to select a material, for instance a suitable plastic material, which is preferably pervious in the region of the longwave infrared radiation, for instance polyethylene, or $As_2S_3$-glass, Se-glass or As-Se-glass and such glasses also can be vapor deposited as a filter upon the polyethylene lense.

Arranged in the radiation direction behind such Fresnel lense is a multiplicity of individual reflectors 2, 3, 4, 5, 6 and so forth. These reflectors 2, 3 . . . 6 can be constructed as concave or convex spherical, paraboloid or ellipsoid segments or as mutually inclined planar or flat mirrors. A detector element 7 is arranged in the embodiment under discussion, at the central region of the Fresnel lense 1. The sensitivity of the detector or sensor element 7 is matched to the infrared radiation which is to be received, for instance there can be used a pyroelectric sensor formed of lithium-tantalate ($LiTaO_3$), polyvinyldifluoride ($PVF_2$), lead-zirconate-titanate (PZT) or any other suitable pyroelectric sensor.

The focal length of the Fresnel lense 1, the curvature, the alignment or direction and the spacing of the reflectors 2, 3 . . . 6 can be chosen such that there is obtained as good as possible imaging of the infrared radiation which arrives from certain desired directions. The individual receiving regions thus become receiving directions having relatively small aperture angle which is dependent upon the accuracy of the optical parts or components and their adjustment as well as upon the dimensions of the sensor element. In the event there is desired a different shape or configuration of the receiving regions, for instance rectangular or strip-shaped, it is possible to aspherically design the reflectors.

With the described optical arrangement there is obtained the result that incident infrared radiation is received by the first focussing means, i.e. by the Fresnel lense 1 with its entire surface or area and only thereafter is such received infrared radiation transmitted to the individual mirror or reflector sgements which are correlated to the different receiving regions or fields of view. Each mirror or reflector segment 2, 3 . . . 6 therefore receives radiation from the entire surface or area of the Fresnel lense 1 and then focusses such radiation upon the sensor element 7. Hence, there is thus received and detected the largest possible quantity of the arriving or incident infrared radiation. The sensitivity of an infrared intrusion detector equipped with such arrangement therefore is appreciably enlarged. Moreover, the dimensions of the reflectors do not play any decisive role, so that even when working with a multiplicity of receiving regions it is possible for the detector to possess small dimensions.

Figure 2:
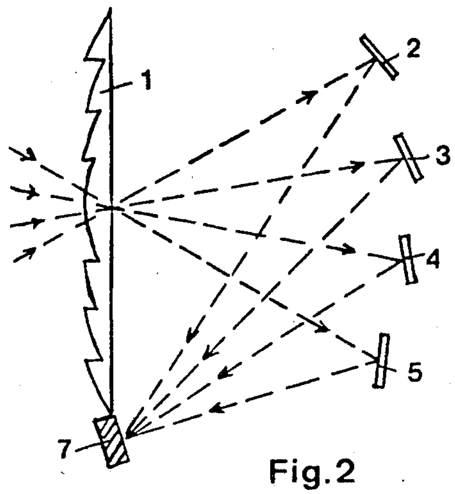
FIG. 2 illustrates a second optical arrangement with a peripherally mounted sensor element.

FIG. 2 illustrates a similar arrangement, differing from the first discussed embodiment of FIG. 1 in that, here the sensor element 7 is arranged peripherally, i.e. at the edge of the Fresnel lense 1. Hence, the entire opening of the Fresnel lense 1 is available for the reception of the infrared radiation and no losses are present because of the sensor element 7. In this exemplary embodiment it is advantageous if the reflectors, such as the reflectors or mirrors 2, 3, 4 and 5 are only slightly curved or of planar or flat construction, in order to maintain as small as possible imaging errors due to relatively oblique incident radiation.

Figure 3:
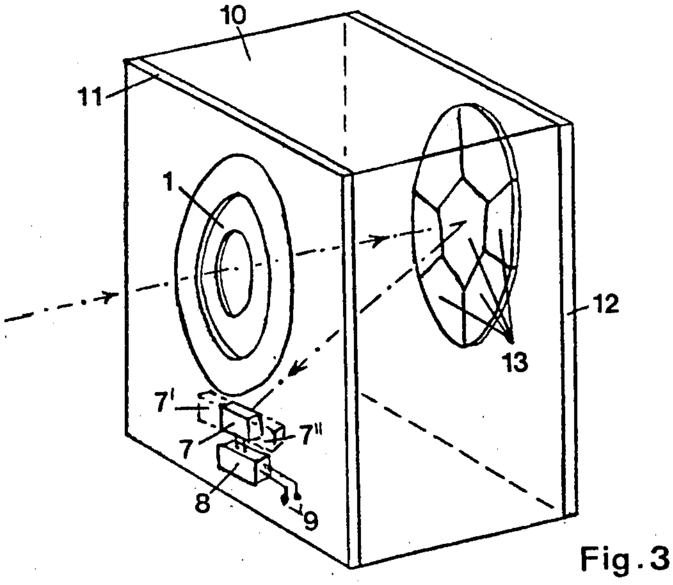
FIG. 3 illustrates an infrared intrusion detector having a faceted mirror or reflector.

FIG. 3 illustrates a construction of infrared intrusion detector possessing a housing 10 having a front plate 11 and rear side or rear portion 12. The front plate 11 carries a Fresnel lense 1 and below such front plate 11 there is arranged at the plate edge a sensor element 7 which can be connected with an integrated evaluation circuit 8, for instance corresponding to the evaluation circuit disclosed in U.S. Pat. No. 4,179,691 or U.S. Pat. No. 4,166,955 to which reference may be readily had and the disclosure of which is incorporated herein by reference. The output signal of such evaluation circuit 8 is removed at the output terminals 9. The rear side 12 of the detector housing 10 carries a faceted mirror or reflector 13, the individual facets of which form the reflectors or mirrors 2, 3 . . . 6 and so forth. The construction and alignment of the individual facets is such that in conjunction with the Fresnel lense 1 there is achieved a focussing of a great many receiving directions or regions with small aperture angle.

According to a further advantageous modification of the invention it is possible to provide, instead of a single sensor element, a plurality of juxtapositioned or adjacently arranged sensor elements, for instance the sensor elements 7, 7' and 7'' shown in FIG. 3. Each sensor element 7, 7' and 7'' thus receives radiation from a plurality of receiving regions or fields of view. The number of possible receiving regions thus can be multiplied in accordance with the number of sensor elements, and there is not experienced any intensity or sensitivity loss, since each sensor element receives the entire radiation from the the common focussing means. It can be advantageous to use as the sensor element a so-called sensor array, wherein the individual elements are arranged adjacent one another in a line or row. The individual receiving regions are thus split in each case into a bundle of a plurality of receiving regions located in a plane. In this way it is possible in a most simple manner to provide a multiplicity of radiation curtains which must be passed by an intruder.

Figure 4:
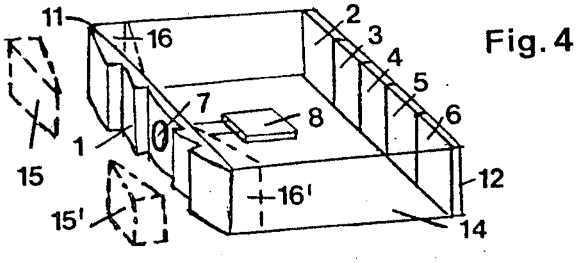
FIG. 4 illustrates an infrared intrusion detector containing a linear reflector arrangement.

Finally, in FIG. 4 there is illustrated a particularly flat construction of infrared intrusion detector, wherein the entire front side 11 is occupied by a segment of a Fresnel lense 1, at the central region of which there is arranged the sensor element 7. At the rear side 12 of the infrared intrusion detector there are arranged in a row next to one another the individual reflectors or mirrors 2, 3 . . . 6. At the base plate 14 there is mounted the evaluation circuit 8, which may be of the type disclosed in conjunction with the description of FIG. 3. With this arrangement it is possible to form a fan of receiving regions located in a plane or a protective curtain. By virtue of its flat design the detector can be mounted in an inconspicuous manner in a narrow gap or opening, and the front surface 11 can be optimumly employed for the reception of the infrared radiation from the receiving regions.

According to a further advantageous construction of the invention it is possible to arrange forwardly or behind parts of the collecting lense 1 one or a number of prisms, by means of which the individual receiving beams or radiation can be split in each instance into a number of radiation beams. Consequently, it is possible to multiply the number of radiation receiving regions or fields of view in the event there can be tolerated a certain intensity attenuation of the individual receiving regions.

With the embodiment of infrared intrusion detector illustrated in FIG. 4 there can be arranged, for instance, forwardly of both sides of the Fresnel lense 1 the prisms 15 and 15'. These prisms 15 and 15' cause the radiation incident at the prisms 15 and 15' to be deflected through a certain angle, whereas the radiation directly impinging upon the Fresnel lense 1 remains unaffected. Each receiving region therefore is split into three separate regions.

Also, each prism element 15 or 15' can be united and integrated with the collecting or Fresnel lense 1, in that it can be designed as a multizone lense having zones possessing different respective optical axes. In FIG. 4 it is possible, for instance, for the sides of the Fresnel lense 1 to possess at their front or rear side the shape of wedges 16 and 16', which replace the prisms or prism members 15 and 15' and produce the same optical effect. Such optical element is particularly simple to fabricate and does not require any special adjustment work.

The illustrated constructions of infrared intrusion detectors possess, notwithstanding their flat inconspicuous shape or configuration and their small dimensions, an optimum sensitivity, and additionally, possess a construction which is particularly simple and not prone to disturbance or malfunction. Such infrared intrusion detectors are especially suitable for applications where there is desired an infrared protective curtain with closely adjacently situated receiving regions or fields of view located in one plane.

While there are shown and described present preferred embodiments of the invention, it is to be distinctly understood that the invention is not limited thereto, but may be otherwise variously embodied and practiced within the scope of the following claims. Accordingly,

What we claim is:

1. An optical arrangement for an infrared intrusion detector comprising:

at least one sensor element;

a plurality of optical focussing means for focussing infrared radiation received from a plurality of separate receiving regions upon said at least one sensor element;

a first common focussing means;

said plurality of optical focussing means comprising a number of further focussing means;

said first common focussing means directing the radiation incident from all of the receiving regions upon said number of further focussing means;

each of said further focussing means being operatively correlated for each sensor element to one of the receiving regions;

the number of further focussing means corresponding to the number of receiving regions per sensor element; and said further focussing means being constructed and arranged such that the radiation arriving from each receiving region is focussed by the first common focussing means and then by the operatively correlated further focussing means upon the sensor element.

2. The optical arrangement as defined in claim 1, wherein:

said at least one sensor element comprising a common sensor element for all of said plurality of separate receiving regions.

3. The optical arrangement as defined in claim 1, wherein:

said first common focussing means comprises a collecting lense.

4. The optical arrangement as defined in claim 3, wherein:

said collecting lense comprises a Fresnel lense.

5. The optical arrangement as defined in claim 1, further including:

at least one prism element arranged to one side of the first common focussing means for splitting and multiplying the receiving regions.

6. The optical arrangement as defined in claim 5, wherein:

said at least one prism element is arranged forwardly of the first common focussing means.

7. The optical arrangement as defined in claim 5, wherein:

said at least one prism element is arranged rearwardly of said first common focussing means.

8. The optical arrangement as defined in claim 5, wherein:

said prism element is combined with said first common focussing means into a multi-zone lense.

9. The optical arrangement as defined in claim 1, wherein:

said further focussing means comprises reflectors.

10. The optical arrangement as defined in claim 9, wherein:

said reflectors are structured as spherical mirror-segments.

11. The optical arrangement as defined in claim 9, wherein:

said reflectors are structured as planar mirrors which are inclined relative to one another.

12. The optical arrangement as defined in claim 9, wherein:

said reflectors are structured to constitute a faceted mirror.

13. The optical arrangement as defined in claim 9, wherein:

said reflectors are arranged in a row adjacent one another.

14. The optical arrangement as defined in claim 1, wherein:

said sensor element is arranged substantially at the central region of the first common focussing means.

15. The optical arrangement as defined in claim 1, wherein:

said sensor element is arranged at an edge of the first common focussing means.

16. The optical arrangement as defined in claim 1, wherein:

a plurality of common sensor elements for a number of receiving regions are arranged adjacent one another.

17. An optical arrangement for an infrared intrusion detector comprising:

at least one sensor element;

a plurality of optical focussing means for focussing infrared radiation received from a plurality of separate receiving regions upon said at least one sensor element;

a first common focussing means constituted by a single Fresnel lense;

said plurality of optical focussing means comprising a number of further focussing means;

said single Fresnel lense directing the radiation incident from all of the receiving regions upon said number of further focussing means;

each of said further focussing means being operatively correlated for each sensor element to one of the receiving regions;

the number of further focussing means corresponding to the number of receiving regions per sensor element; and said further focussing means being constructed and arranged such that the radiation arriving from each receiving region is focussed by the single Fresnel lense and then by the operatively correlated further focussing means upon the sensor element.

* * * * *